UNITED STATES PATENT OFFICE 2,438,953

THERMOPLASTIC LENS CEMENT

Horace C. Thuline, William F. Parsons, and George P. Waugh, Rochester, N. Y., assignors to Eastman Kodak Company, Rochester, N. Y., a corporation of New Jersey No Drawing. Application June 8, 1943, Serial No. 490,082

6 Claims. (Cl. 260—27)

This invention relates to a thermoplastic lens cement and to a process for the preparation thereof.

It is known that thermoplastic resins can be plasticized and softened with various plasticizers. However, when the known plasticizers are used in quantity sufficient to give satisfactory toughness at low temperatures, the plasticizer will so soften the resin that at ordinary temperatures, or above, the plasticized composition is of no value for cementing lenses.

For cementing together the elements of lenses, especially those used in aerial optical instruments and those used in extremely cold or hot climates, it is desirable to have a colorless or nearly colorless cement which will adhere permanently to the glass, has considerable strength and will withstand any extremes of heat and cold which are likely to be encountered in use. Canada balsam has been used extensively as a lens cement, but suffers from the disadvantage that it does not withstand extremes of temperature.

We have now found that a composition comprising a poly-α-methacrylate selected from the group consisting of poly-n-butyl-α-methacrylate and copolymers of n-butyl-α-methacrylate with an α-methacrylate selected from the group consisting of methyl α-methacrylate, ethyl α-methacrylate and n-propyl α-methacrylate, together with a substance selected from the group consisting of chlorinated biphenyl resins and esters of hydrogenated abietic acid (hydrogenated rosin), is an excellent lens cement surpassing Canada balsam in its ability to withstand the extremes of temperature.

It is, accordingly, an object of our invention to provide a new lens cement. It is a further object to provide a process for preparing such a lens cement. A still further object is to provide a lens the elements of which are cemented together with such a cement, and to provide a process for cementing said elements together. Other objects will become apparent hereinafter.

In accordance with our invention, we prepare our lens cement by combining a poly-α-methacrylate selected from the group consisting of poly-n-butyl α-methacrylate and copolymers of n-butyl-α-methacrylate with an α-methacrylate selected from the group consisting of methyl α-methacrylate, ethyl α-methacrylate and n-propyl α-methacrylate, with a chlorinated biphenyl resin, or with an ester of hydrogenated abietic acid (hydrogenated rosin), or with both. As chlorinated biphenyl resins (chlorinated biphenyls containing at least about 68 per cent by weight of chlorine), those having a refractive index of about 1.66, are advantageously employed, since the resulting cement has a refractive index of from 1.5 to 1.6 and thus has the valuable property of greatly decreasing the optical effects of scratches and pits on the cementing surfaces.

As esters of hydrogenated abietic acid (hydrogenated rosin), the polyhydric alcohol esters, e. g. the glycerol ester, the ethylene glycol ester, the diethylene glycol ester, and the triethylene glycol ester, are advantageously employed.

Our new lens cement can be prepared in a solid or stick form by polymerizing substantially completely n-butyl-α-methacrylate or a mixture of n-butyl-α-methacrylate with methyl α-methacrylate, ethyl α-methacrylate or n-propyl α-methacrylate, in the presence of a chlorinated biphenyl resin or an ester of hydrogenated abietic acid, or both. Heat accelerates the polymerization. A polymerization catalyst, such as an organic peroxide, e. g. benzoyl peroxide, is advantageously employed. Such solid or stick cement can also be prepared by melting poly-n-butyl-α-methacrylate, or a copolymer of n-butyl-α-methacrylate and methyl, ethyl or n-propyl-α-methacrylate, with a chlorinated biphenyl resin, or with an ester of hydrogenated abietic acid, or with both.

Such solid or stick cement is especially useful for cementing small or medium-sized lenses. The cement is soft enough at elevated temperatures that it can be applied to warm lenses in a molten state, after which the elements of the lens can be pressed together and worked to remove air bubbles, suitably centered, and allowed to cool, whereby permanent union of the elements is achieved.

In cementing very large aerial lenses (115 mm. in diameter), it is dangerous and inconvenient to use a stick thermoplastic cement because the lenses must be heated to a high temperature (300° to 360° F.) to melt the cement to such a viscosity that it applies easily. At these temperatures the lenses often crack and the operator has difficulty handling the very warm lens elements. For use in cementing such large lenses, we prepare our new cement in a liquid form by partially polymerizing n-butyl-α-methacrylate, or a mixture of n-butyl-α-methacrylate and methyl-α-methacrylate, ethyl α-methacrylate or n-propyl-α-methacrylate, in the presence of a chlorinated biphenyl resin, or an ester of hydrogenated abietic acid, or both.

The following examples will serve to illustrate the manner of practicing our invention. These examples are not intended to limit our invention.

Example 1

1.2 parts of benzoyl peroxide were dissolved in 38.8 parts of n-butyl methacrylate, and 60 parts of the glycerol ester of hydrogenated rosin were added and dissolved. This solution was filtered in a pressure filter through felt and bolting silk, and was then poured into small straight sided narrow glass vials, of about one ounce capacity, and was left for 20 hours at 200° F. During this time the butyl methacrylate polymerized and a homogeneous, clear yellow solid is obtained. A stick was inserted to serve as a handle for ease of handling, and the whole block was cooled to about 20° F. Brief heating over a fire then enabled the glass to be easily pulled off.

Example 2

The lens elements to be cemented were assembled without cement and heated on an electric hot plate to about 160° C. The upper element was removed, a stick of cement rubbed on the lower element until the proper amount of cement was melted onto the glass, then the upper lens element was replaced and the lens assembly worked to remove air bubbles. The glass was allowed to cool to about 120° C. at which stage the two elements were centered on a rotating chuck, and the cemented lens was then allowed to cool to room temperature.

Example 3

Lens cement was made in stick form by the method of Example 1 except that 65 parts of a solution of n-butyl methacrylate containing 3% its weight of benzoyl peroxide were used with 35 parts of the diethylene glycol ester of hydrogenated rosin. A solid thermoplastic cement resulted which was similar to that of Example 1, except that it was slightly softer at room temperature and at elevated temperatures.

Example 4

A stick of thermoplastic lens cement was made by melting together in a tube, heated in an oil bath, 60 parts of the diethylene glycol ester of hydrogenated rosin and 40 parts of commercial poly n-butyl methacrylate.

Example 5

A stick of thermoplastic lens cement was made by melting together in a tube, heated in an oil bath, 60 parts of commercial poly n-butyl methacrylate and 40 parts of the ethylene glycol ester of hydrogenated rosin.

Example 6

A stick of thermoplastic lens cement was made up by melting together in a tube, heated in an oil bath, 60 parts of commercial poly n-butyl methacrylate and 40 parts of the diethylene glycol ester of hydrogenated rosin.

Example 7

A stick of thermoplastic lens cement was made up by melting together in a tube, heated in an oil bath, 60 parts of commercial poly n-butyl methacrylate and 40 parts of the triethylene glycol ester of hydrogenated rosin.

Cements made with butyl methacrylate and either the glycerol ester of hydrogenated rosin or a chlorinated biphenyl resin containing at least 68 per cent by weight of chlorine and having a refractive index of about 1.66 resemble each other rather closely with one exception; the cement made using the chlorinated biphenyl resin has a definitely higher index of refraction. Due to these facts, mixtures of the glycerol ester of hydrogenated rosin and the chlorinated biphenyl resin may be used with poly butyl methacrylate and the proportions of the two softeners may be adjusted to give the desired refractive index as long as the physical properties of the cement remain good, which is the case as long as poly n-butyl methacrylate comprises about 30 to 40 per cent of the total constituents.

Example 8

High index lens cement was made in stick form by the method of Example 1 except 40 parts of n-butyl methacrylate containing 3% its weight of benzoyl peroxide were used with 60 parts of a chlorinated biphenyl resin containing at least 68 per cent by weight of chlorine and having a refractive index of about 1.66.

It is also desirable to be able to produce a cement with a moderately high index but not as high as that made in Example 8. This was made as in Example 9.

Example 9

Moderately high index lens cement was made in stick form by the method of Example 1 except 40 parts of n-butyl methacrylate containing 3% its weight of benzoyl peroxide were used with 40 parts of a chlorinated biphenyl resin containing at least 68 per cent by weight of chlorine and having a refractive index of about 1.66 and 20 parts of the glycerol ester of hydrogenated rosin.

Example 10

A thermoplastic lens cement was made by mixing three parts of benzoyl peroxide, 70 parts of the glycerol ester of hydrogenated rosin and 27 parts of n-butyl methacrylate. The mixture was given an initial high temperature (160° C.) partial polymerization to give a viscosity of 3000 cps. Large lenses were preheated in an oven to 200° F., cemented with this cement, and baked for two hours. At the end of this time, the two elements of the lenses were set to such an extent that they could be trued optically, and the cement was sufficiently thermoplastic to permit this truing without developing cement starts or other cement defects. The trued lenses were then removed from truing chuck and allowed to cool.

Lenses cemented by the methods of Examples 2 and 10 using cement prepared by the methods of this application, were tested for their ability to withstand extremes of temperature. The tests were made by cooling the cemented lens to between −50° F. to −80° F., immediately placing it in a temperature of 140° F., cooling it again to between −50° F. to −80° F., heating it again, and so on, through nine cycles. Although all the examples quoted are capable of producing a useful lens cement, the material produced by the method of Examples 1, 8, 9, and 10 withstood these tests most satisfactorily, are convenient to prepare, and are the most easily used.

Example 11

1.5 parts of benzoyl peroxide were dissolved in 49.3 parts of monomeric n-butyl methacrylate, and 17.2 parts of monomeric methyl methacrylate. To this mixture was added 32.00 parts of the glycerol ester of hydrogenated rosin. The mixture was then polymerized at high heat until a viscosity of about 3100 centipoises was obtained. It was then cooled in a water surrounded cooling coil. This cement was then filtered through a small filter press (the filter consisting of filter paper and silk), placed in jars and stored in a refrigerator until ready for use.

*Example 12*

1.5 parts of benzoyl peroxide were dissolved in 47.8 parts of monomeric n-butyl methacrylate, 15.7 parts of monomeric methyl methacrylate and 3.0 parts of glycerol triacetate. The mixture was partially polymerized by the same procedure as Example 11. After partial polymerization the 32.00 parts of the glycerol ester of hydrogenated rosin was mixed into the partially polymerized copolymer. The mixture was then filtered through a small filter press (the filter consisting of filter paper and silk) and stored in a refrigerator when not in use.

*Example 13*

A liquid thermoplastic cement was made by the procedure of Example 12, only a chlorinated biphenyl resin containing at least 68 per cent by weight of chlorine and having a refractive index of about 1.66 was mixed with the partially polymerized copolymer.

Lens elements were cemented using the cement of Examples 11, 12 or 13 as follows: The lens elements were preheated to a temperature between 160° and 200° F. The cement was poured on one element of the lens and the other element placed in position. The air bubbles and excess cement were then worked out. The lens elements were then roughly held in position by two V-clamps, and the elements in this position were heated at a temperature of from 160° to 205° F. for a period of from 1¾ to 2½ hours depending upon the temperature used. It has been found that a preheating temperature of 160° F. and a final temperature of 205° F. are very satisfactory. Working at these temperatures, 1¾ hours are required to form a cement layer which is permanent and which is thermoplastic. After the final heating and while the lens is still at the cementing temperature, the lens is trued optically and allowed to cool in this position. Lenses cemented using these cements of Examples 11, 12 and 13 have been tested repeatedly in cycles of extreme cold and heat being subjected to temperature shocks by removing them from a temperature of minus 60° F. and then placing them directly in a temperature of plus 140° F. After repeated cycles of this nature, the cement layer showed no deterioration.

The lens cements described in Examples 1, 3, 4, 5, 6, 7, 10, 11 and 12 consist of a poly-α-methacrylate and an ester of a polyhydric alcohol and hydrogenated abietic acid, the ester of the hydrogenated abietic acid constituting from 32.5 to 72.2% of the combined weight of the poly-α-methacrylate and the ester of the hydrogenated abietic acid.

What we claim and desire to be secured by Letters Patent of the United States is:

1. A lens cement consisting of a poly-α-methacrylate selected from the group consisting of poly-n-butyl-α-methacrylate and copolymers of n-butyl-α-methacrylate with an α-methacrylate selected from the group consisting of methyl α-methacrylate, ethyl α-methacrylate and n-propyl α-methacrylate, together with an ester of a polyhydric alcohol and hydrogenated abietic acid, the ester of the hydrogenated abietic acid constituting from 32.5 to 72.2 per cent of the combined weight of the poly-α-methacrylate and the ester of the hydrogenated abietic acid.

2. A lens cement consisting of poly-n-butyl-α-methacrylate and an ester of a polyhydric alcohol and hydrogenated abietic acid, the ester of the hydrogenated abietic acid constituting from 32.5 to 72.2 per cent of the combined weight of the poly-n-butyl-α-methacrylate and the ester of the hydrogenated abietic acid.

3. A lens cement consisting of a copolymer of methyl α-methacrylate and n-butyl-α-methacrylate together with an ester of a polyhydric alcohol and hydrogenated abietic acid, the ester of the hydrogenated abietic acid constituting from 32.5 to 72.2 per cent of the combined weight of the copolymer and the ester of the hydrogenated abietic acid.

4. A lens cement consisting of poly-n-butyl-α-methacrylate and the glycerol ester of hydrogenated abietic acid, the glycerol ester constituting 60% of the combined weight of the poly-n-butyl-α-methacrylate and the glycerol ester.

5. A lens cement consisting of a copolymer of n-butyl-α-methacrylate and methyl α-methacrylate together with the glycerol ester of hydrogenated abietic acid, the glycerol ester constituting 32.5% of the combined weight of the copolymer and the glycerol ester.

6. A lens cement consisting of poly-n-butyl-α-methacrylate and the diethylene glycol ester of hydrogenated abietic acid, the diethylene glycol ester constituting 60% of the combined weight of the poly-n-butyl-α-methacrylate and the diethylene glycol ester.

HORACE C. THULINE.
WILLIAM F. PARSONS.
GEORGE P. WAUGH.

REFERENCES CITED

The following references are of record in the file of this patent:

UNITED STATES PATENTS

| Number | Name | Date |
|---|---|---|
| 2,085,816 | Meigs | July 6, 1937 |
| 2,095,944 | Bauer et al. | Oct. 12, 1937 |
| 2,211,689 | Dittmar | Aug. 13, 1940 |
| 2,272,827 | Barnes | Feb. 10, 1942 |
| 2,060,104 | Moulton | Nov. 10, 1936 |
| 1,340,189 | Tillyer | May 18, 1920 |
| 2,092,789 | Tillyer | Sept. 14, 1937 |
| 576,896 | Rudolph | Feb. 9, 1897 |
| 2,225,039 | Diggins | Dec. 17, 1940 |
| 1,653,040 | Drake | Dec. 20, 1927 |
| 1,713,708 | Merte | May 21, 1929 |
| 1,025,766 | Straubel | May 7, 1912 |
| 2,117,321 | Hill | May 17, 1938 |
| 2,129,663 | Barrett | Sept. 13, 1938 |
| 2,316,274 | Mitchell | Apr. 13, 1943 |
| 2,364,875 | Schieman | Dec. 12, 1944 |

FOREIGN PATENTS

| Number | Country | Date |
|---|---|---|
| 809,573 | France | Mar. 6, 1937 |

OTHER REFERENCES

Strain et al., Ind. & Eng. Chem., vol 31, April 1939, pages 382 to 387.